(12) United States Patent
Huang et al.

(10) Patent No.: US 7,697,124 B2
(45) Date of Patent: Apr. 13, 2010

(54) APPARATUS FOR MEASURING STRAY LIGHT IN LENS MODULE

(75) Inventors: Hai-Jo Huang, Taipei Hsien (TW);
Sheng-An Wang, Taipei Hsien (TW);
Ming-Shan Chan, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 227 days.

(21) Appl. No.: 12/033,213

(22) Filed: Feb. 19, 2008

(65) Prior Publication Data
US 2009/0141268 A1    Jun. 4, 2009

(30) Foreign Application Priority Data
Nov. 30, 2007    (CN) .................... 2007 1 0202810

(51) Int. Cl.
*G01B 9/00* (2006.01)
*G01J 1/00* (2006.01)

(52) U.S. Cl. ..................... 356/124; 356/213

(58) Field of Classification Search ......... 356/124–128, 356/213–218
See application file for complete search history.

(56) References Cited

U.S. PATENT DOCUMENTS

| 4,526,470 A | * | 7/1985 | Kaye ........................ 356/319 |
| 5,801,829 A | * | 9/1998 | Mueller et al. .............. 356/326 |
| 6,038,038 A | * | 3/2000 | Selby et al. ................. 358/446 |
| 6,900,887 B2 | | 5/2005 | Kim |

* cited by examiner

*Primary Examiner*—Michael P Stafira

(57) ABSTRACT

An apparatus for measuring stray light in a lens module includes a light source, an image sensor, an object distance adjusting unit, and an object distance measuring device. The light source is disposed at an object side of the lens module for emitting light to the lens module. The image sensor is disposed at an image side of the lens module for measuring an intensity of stray light coming into the lens module. The object distance adjusting unit includes an opaque barrier defining a slit therein, and a laser aligned with the slit, the laser being configured for emitting a laser light beam through the slit thereby forming a light spot serving as an object. The object distance measuring device is configured for measuring an object distance. The opaque barrier of the object distance adjusting unit is movable relative to the wavefront sensor so as to adjust the object distance.

6 Claims, 1 Drawing Sheet

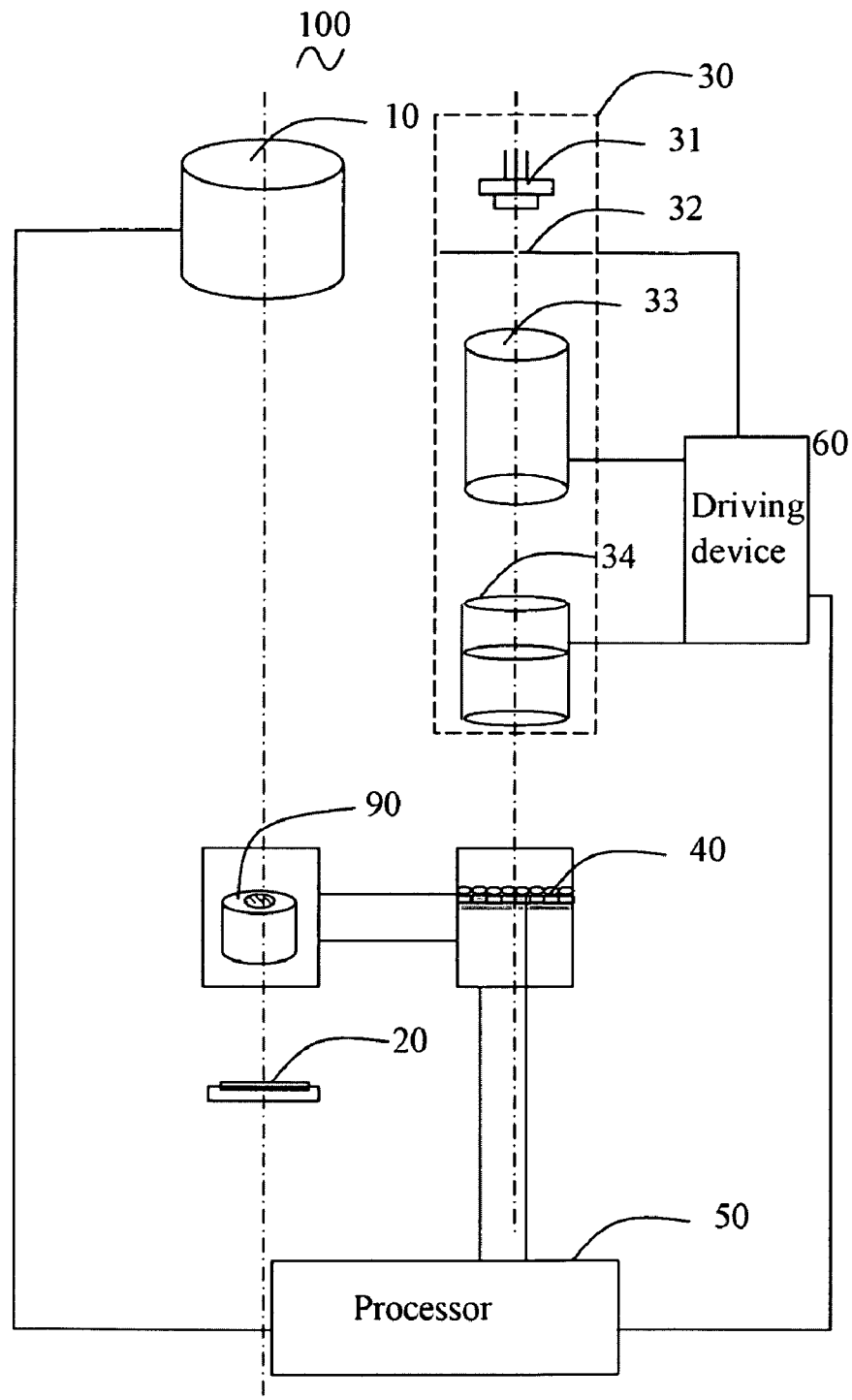

APPARATUS FOR MEASURING STRAY LIGHT IN LENS MODULE

TECHNICAL FIELD

The present invention relates to a lens module and, particularly, to an apparatus for measuring stray light in a lens module.

DESCRIPTION OF RELATED ART

With the development of optical imaging technology, image capturing devices are widely used in electronic devices, such as digital cameras and mobile phones. Naturally, there is always a demand for better quality pictures.

lens modules are an important component in these image capturing devices, the quality of the lens module usually determines the quality of images captured by these devices. Therefore, it is important to measure stray light in a lens module in order to evaluate the quality of the lens module. Prior apparatuses for measuring stray light in lens modules usually only measure the stray light corresponding to a certain object distance, and the stray light in the lens module corresponding to other object distances are not taken into account, which results in less accurately determining the quality of the lens module.

What is needed, therefore, is an apparatus for measuring stray light in lens module which can solve the above problem and measure stray light in the lens module corresponding to many different object distances.

SUMMARY

In accordance with one present embodiment, an apparatus for measuring stray light in a lens module includes a light source, an image sensor, an object distance adjusting unit, and an object distance measuring device. The light source is disposed at an object side of the lens module for emitting light to the lens module. The image sensor is disposed at an image side of the lens module for measuring an intensity of stray light coming into the lens module. The object distance adjusting unit includes an opaque barrier defining a slit therein, and a laser aligned with the slit, the laser being configured for emitting a laser light beam through the slit thereby forming a light spot serving as an object. The object distance measuring device is configured for measuring an object distance between the object and the wavefront sensor. The opaque barrier of the object distance adjusting unit is movable relative to the wavefront sensor so as to adjust the object distance.

BRIEF DESCRIPTION OF THE DRAWING

Many aspects of the present apparatus for measuring stray light in lens modules can be better understood with reference to the following drawings. The components in the drawing are not necessarily drawn to scale, the emphasis instead being placed upon clearly illustrating the principles of the present image capturing device. Moreover, in the drawings, like reference numerals designate corresponding parts throughout the several views.

The drawing is a schematic diagram of an apparatus for measuring stray light according to a present embodiment.

DETAILED DESCRIPTION OF THE EMBODIMENTS

Embodiments will now be described in detail below, with reference to the drawings.

Referring to the drawing, an apparatus 100 for measuring stray light in a lens module 90, according to an embodiment, is shown. The apparatus 100 includes a light source 10, an image sensor 20, an object distance adjusting unit 30, and an object distance measuring device 40. The apparatus 100 can measure stray light in lens module 90 corresponding to many different object distances.

The light source 10 is disposed at an object side of the lens module 90 during measuring stray light in the lens module 90 for providing light during the process of measuring stray light in the lens module 90 corresponding to each object distance.

The image sensor 20 is disposed at an image side of the lens module 90 for measuring an intensity of stray light coming into the lens module 90. The stray light can be evaluated based on the intensity thereof. The image sensor 20 can be moved relative to the lens module 90 along an optical axis of the lens module 90 during focusing. The image sensor 20 can be a charge-coupled device (CCD) or a complementary metal oxide semiconductor device (CMOS). The image sensor 20 can further be selected from a group consisting of a ceramic leaded chip carrier (CLCC) package type image sensor, a plastic leaded chip carrier (PLCC) package type image sensor, and a chip scale package (CSP) type image sensor.

The object distance adjusting unit 30 is configured for providing an object with a variable object distance. In the present embodiment, the object distance adjusting unit 30 includes a laser 31, an opaque barrier (not labeled), such as sheet of paper or cardboard, defining a slit 32 therein, a collimator 33, and a zoom lens group 34, along the light path of the laser 31. The laser 31 is configured for emitting a laser light beam through the slit 32 thereby forming a light spot serving as an object. The collimator 33 and the zoom lens group 34 are configured for changing the object distance of the object. In the present embodiment, the zoom lens is configured for creating a virtual image of the object, and the object distance of the object is from the virtual image to the object distance adjusting unit 30. The object distance of the object can be changed by changing the distance between the laser 31 and the slit 32, changing the distance between the collimator 33 and the zoom lens group 34, or changing the distance between the lenses of the zoom lens group 34 only. In the present embodiment, the laser 31 is a laser diode.

The object distance measuring device 40 is configured for measuring the object distance. In the present embodiment, the object distance measuring device 40 is a wavefront sensor, i.e., a Shack-Hartmann wavefront sensor. The wavefront sensor can obtain a wavefront radius of the light coming through the slit 32. The wavefront radius is the object distance of the light spot.

In the process of measuring stray light in lens module 90, the object distance measuring device 40 is moved to a position aligned with the object distance adjusting unit 30 for measuring an object distance of the light spot, then, the lens module 90 is moved to replace the object distance measuring device 40 together with the image sensor 20. And then, focus the lens module 90 by moving the image sensor 20 and keeping the lens module 90 stationary. After that, move the lens module 90 together with the image sensor 20 to measure stray light in the lens module 90 corresponding to said object distance using the light source 10. By changing the object distance of the light spot and repeating the process, the stray light in the lens module 90, corresponding to many different object distances, can be measured. Accordingly, the quality of the lens module 90 can be accurately evaluated.

It is understood that the object distance of the light spot can be changed by a driving device 60, and the process of measuring stray light in lens module 90 can be controlled by a processor 50 which can also be used for processing the image captured by the image sensor 20, processing information obtained by the object distance measuring device 40, and controlling the driving device 60.

While certain embodiments have been described and exemplified above, various other embodiments will be apparent to those skilled in the art from the foregoing disclosure. The present invention is not limited to the particular embodiments described and exemplified but is capable of considerable variation and modification without departure from the scope of the appended claims.

What is claimed is:

1. An apparatus for measuring stray light in a lens module, the apparatus comprising:
   a light source for being disposed at an object side of the lens module and emitting light to the lens module;
   an image sensor for being disposed at an image side of the lens module and measuring an intensity of stray light coming into the lens module;
   an object distance adjusting unit comprising:
      an opaque barrier defining a slit therein, and
      a laser aligned with the slit, the laser being configured for emitting a laser light beam through the slit thereby forming a light spot serving as an object; and
   a wavefront sensor configured for measuring an object distance between the object and the wavefront sensor, wherein the opaque barrier of the object distance adjusting unit is movable relative to the wavefront sensor so as to adjust the object distance.

2. The apparatus as claimed in claim 1, wherein the image sensor is one of a charge-coupled device and a complementary metal oxide semiconductor device.

3. The apparatus as claimed in claim 1, wherein the image sensor is selected from a group consisting of a ceramic leaded chip carrier package type image sensor, a plastic leaded chip carrier package type image sensor, and a chip scale package type image sensor.

4. The apparatus as claimed in claim 1, wherein the wavefront sensor is a Shack-Hartmann wavefront sensor.

5. An apparatus for measuring stray light in a lens module, the apparatus comprising:
   a light source for being disposed at an object side of the lens module and emitting light to the lens module;
   an image sensor for being disposed at an image side of the lens module and measuring an intensity of stray light coming into the lens module;
   an object distance adjusting unit comprising:
      an opaque barrier defining a slit therein,
      a laser aligned with the slit, the laser being configured for emitting a laser light beam through the slit thereby forming a light spot on the opaque barrier serving as an object, and
      a zoom lens; and
   a wavefront sensor, wherein the zoom lens is interposed between the opaque barrier and the wavefront sensor, the zoom lens is configured for creating a virtual image of the object, and the wavefront sensor is configured for measuring an object distance between the virtual image of the object and the wavefront sensor.

6. The apparatus as claimed in claim 5, wherein the wavefront sensor is a Shack-Hartmann wavefront sensor.

* * * * *